(12) United States Patent
Waters et al.

(10) Patent No.: US 9,659,274 B2
(45) Date of Patent: May 23, 2017

(54) INVENTORY TRACKING AND MANAGEMENT

(71) Applicant: GPS of Things, Inc., San Jose, CA (US)

(72) Inventors: Christopher J. Waters, San Jose, CA (US); Brent R. Humphrey, San Jose, CA (US)

(73) Assignee: GPS of Things, Inc., San Jose, CA (US)

( * ) Notice: Subject to any disclaimer, the term of this patent is extended or adjusted under 35 U.S.C. 154(b) by 95 days.

(21) Appl. No.: 14/831,560

(22) Filed: Aug. 20, 2015

(65) Prior Publication Data

US 2016/0055451 A1  Feb. 25, 2016

Related U.S. Application Data

(60) Provisional application No. 62/041,522, filed on Aug. 25, 2014.

(51) Int. Cl.
*G06Q 10/08* (2012.01)
*H04W 4/02* (2009.01)

(52) U.S. Cl.
CPC ............ *G06Q 10/087* (2013.01); *H04W 4/02* (2013.01)

(58) Field of Classification Search
CPC ....... G06K 7/10366; G06K 2017/0045; G06K 19/0723; G06K 2017/0051; G06K 7/0008; G06K 7/10099; G06K 7/10475; G06K 19/07749; G06K 19/07767
See application file for complete search history.

(56) References Cited

U.S. PATENT DOCUMENTS

| | | | |
|---|---|---|---|
| 6,009,359 A | 12/1999 | El-hakim et al. | |
| 6,259,367 B1 | 7/2001 | Klein | |
| 7,385,510 B2* | 6/2008 | Childress | G06Q 10/08 235/462.22 |
| 7,448,546 B2 | 11/2008 | Jung et al. | |
| 7,468,650 B2* | 12/2008 | Childress | G06K 17/00 340/5.92 |
| 7,680,691 B2 | 3/2010 | Kimball et al. | |
| 7,852,219 B2* | 12/2010 | Childress | G06Q 10/08 340/572.1 |
| 8,253,559 B2 | 8/2012 | Howard et al. | |

(Continued)

FOREIGN PATENT DOCUMENTS

EP  2733502 A1  5/2014

OTHER PUBLICATIONS

Transmittal of the International Search Report and the Written Opinion on the International Searching Authority for PCT Application No. PCT/US2015/046300, filed Aug. 21, 2015, mailed Nov. 26, 2015, 7 pages.

(Continued)

*Primary Examiner* — Mark Blouin

(57) ABSTRACT

A method of inventory tracking and management is described. The method may include receiving a location request for an item and determining, using three or more base stations, the location of the item. The method may also include generating, by a processing device, a map of the item's location and item information and sending the map to a user, and sending the location request to the item, where the location request causes the item or the item's container to indicate its presence.

20 Claims, 9 Drawing Sheets

(56) References Cited

U.S. PATENT DOCUMENTS

| | | |
|---|---|---|
| 8,508,356 B2 | 8/2013 | Shuster |
| 8,666,432 B2 | 3/2014 | Gold et al. |
| 2009/0115609 A1* | 5/2009 | Weaver .................. G06Q 10/08 340/572.1 |
| 2010/0302032 A1 | 12/2010 | Abed |
| 2012/0195401 A1 | 8/2012 | Becker |
| 2013/0043978 A1 | 2/2013 | Brooks |
| 2014/0062700 A1 | 3/2014 | Heine et al. |
| 2014/0132411 A1 | 5/2014 | Buchheim et al. |
| 2014/0135041 A1 | 5/2014 | Buchheim et al. |
| 2014/0135042 A1 | 5/2014 | Buchheim et al. |
| 2014/0162702 A1 | 6/2014 | Crawford et al. |

OTHER PUBLICATIONS

Transmittal of the International Preliminary Report on Patentability for PCT Application No. PCT/US2015/046300, filed Aug. 21, 2015, mailed Mar. 9, 2017, 6 pages.

\* cited by examiner

INVENTORY TRACKING AND MANAGEMENT

CROSS REFERENCE TO RELATED APPLICATION

This application claims priority from U.S. provisional patent application 62/041,522 filed on Aug. 25, 2014.

BACKGROUND

The need for tracking technology in household, commercial and industrial items continues to grow as the amount of items that we need to keep track of expands. Several problems exist that make the tracking of everyday items (e.g. people, drill bits, clothing items, pets, camping gear, sun glasses, shoes) prohibitive. Current tracking technologies can be expensive to implement in large quantities of household items. Additionally, many tracking technologies that are in use today may be less effective at tracking household items that reside inside buildings and other containers.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1A:
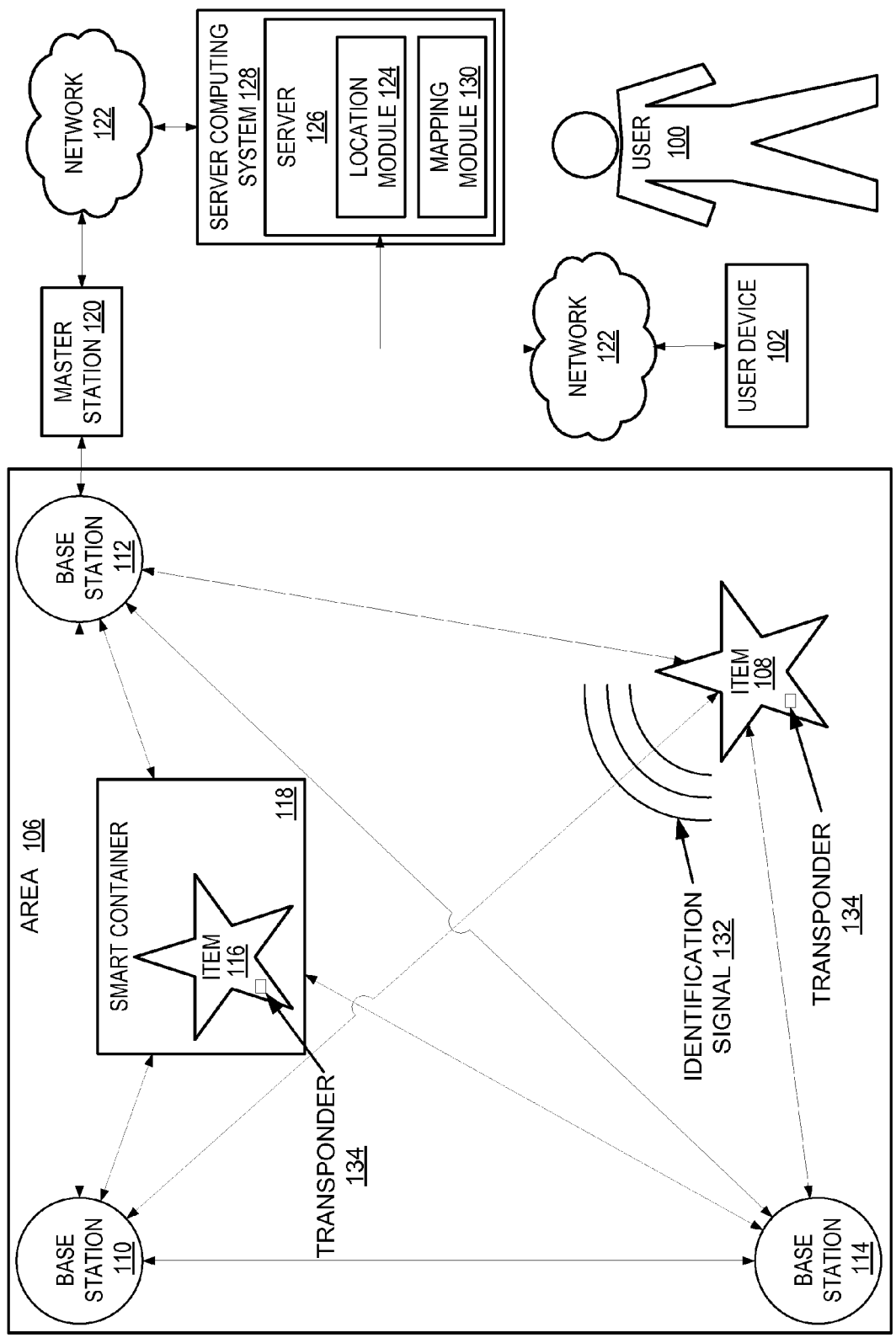
FIG. 1A illustrates a first example inventory tracking and management system in accordance with various implementations.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

People often struggle to keep track of items both inside and outside their homes, workplaces, facilities, and commercial and industrial buildings. A significant contributor to this struggle is the inability to monitor the location of these items. A person may establish systems of sorting and organizing items in order for the person to locate the items quickly. In certain situations, however, items can be misplaced or lost, thereby rendering the systems of sorting and organizing the items ineffective. For example, if an item is placed in the wrong location or the item is forgotten at a remote location, then the location of the item may not be readily apparent.

A system and method are described that can track and manage the location of items that are introduced into an inventory of items. In one embodiment, a transponder affixed to the new item transmits an identification signal that enables the tracking and monitoring of the new item by a location module. The location module maintains an inventory of items and corresponding properties of the items. When the new item affixed with a transponder is introduced to the inventory of items, the identification signal is received by the location module and the location module determines that the identification signal is unregistered in the inventory of items. The location module extracts from the identification signal properties associated with the new item. The location module generates an updated list to include the unregistered identification signal and the extracted properties associated with the new item.

In one embodiment, the location module receives a location request for an item from a user. Using the identification signal of the item, the location module determines the item's location. The location module may present to the user, through a graphical user interface, a map of an area with an indicator showing the location of the item. The location module may send a command to the transponder affixed to the item, causing the transponder to announce the item's presence through the use of flashing lights, emitting sound, vibrating or other indicators.

The location module also tracks and monitors the identification signals associated with items in order to determine usage patterns for the items. By tracking the movement of the identification signals associated with the items the location module determines which items are used more frequently. In one embodiment, the location module may present recommendations and advertisements for items based on which items are used more frequently. For example, if the location module determines that a user frequently drinks coffee, the location module may present the user with recommendations and advertisements tailored towards coffee drinkers. The location module may also provide the user with a notification if a tracked item needs to be restocked or replaced. Alternatively, the location module can generate an order for an item in response to determining that an item needs to be replaced. Further details describing the operation of the inventory tracking and management system and methods are provided below.

FIG. 1A illustrates a first example inventory tracking and management system in accordance with various implementations. A user 100 may request the location 104 of an item 108 in an area 106. The items 108 of which a location may be requested include smart labels. The smart label may be a transponder 134 that transmits an identification signal associated with the item 108. Smart labels may include locating technology (e.g. geographical information systems (GIS), global positioning system (GPS), Bluetooth, radio frequency identification (RFID), near field communication (NFC), local area wireless (WLAN, Wi-Fi), local area network (LAN), Global System for Mobile Communications (GSM), and the like). In some embodiments, smart labels are transponders 134 that may be affixed to the item 108 that the user 100 may want to locate. In other embodiments, smart labels are transponders 134 built into the item 108 during production of the item.

In one embodiment, smart labels include a user-replaceable battery. In other embodiments, smart labels do not include a user-replaceable battery and are instead powered using inductance technologies. Other methods of powering may be utilized to provide power to smart labels such as motion, photovoltaic, micro fuel cell. Energy storage can include compressed air, butane, methane, and other more traditional battery cell technologies. In other embodiments, smart labels may include other systems such as a lighting system (e.g. LEDs), vibration system, motion detection system, sound system, and a graphics display system (e.g. video display). Smart labels may also include a touchscreen, buttons, and other user input systems. In one embodiment, smart labels utilize mass spectrometry to characterize physical, material, fabric color, and other attributes of the item to which they are affixed. Smart labels may also utilize additional sensors such as gyroscope, magnetometer, accelerometer, altitude, temperature, humidity, atmospheric pressure.

The smart labels may be customized with information. A user 100 may want to associate a category with an item. In one embodiment, more than one category may be associated with an item. For example, in the case of a backpack, a user 100 might want to customize the backpack's smart label to include the category "school." In another example, a user 100 might want to customize the same backpack's smart label to include the categories "school" and "hiking." Other information may also be stored on a smart label. For instance, a user 100 might want to define a "home base" for an item, and customize its smart label to reflect that choice. A home base is a location where the item should reside. Setting a home base allows a user 100 to receive notifications when the item is not at its home base. In one embodiment, multiple home bases may be customized and timing information as to when an item should be at various locations may also be set. In one embodiment, a user 100 may continually re-customize a smart label as his or her needs change. Alternatively, a smart label may only be customized only once. It should be noted that in one embodiment, a home base may also be used as a charging station.

In one embodiment, base stations 110, 112, 114 are spread throughout area 106 so that every smart label contained in area 106 is in communication range of three or more base stations 110, 112, 114. Base stations 110, 112, 114 are devices capable of transmitting and receiving locating technology signals. The base stations 110, 112, 114 are also capable of determining air temperature and quality. In one embodiment, base stations 110, 112, 114 are communicatively coupled to a master station 120. The master station 120 is a device capable of receiving and transmitting signals to and from base stations 110, 112, 114. The master station 120 may be communicatively coupled to a server 126 via a network 122. In one embodiment, the master station 120 may maintain a local inventory of system components (e.g., smart labels, base stations, smart containers, etc.) In one embodiment, a user 100 sends a location request to location module 124 on server 126 of server computing system 128 via user device 102. In another embodiment, the user device 102 utilizes voice recognition where the user 100 may vocally ask "where is my item?" Alternatively, the user 100 may request the location of an item via a user interface of an application on the user device 102. The user device 102 may be a personal computer, a tablet computer, a mobile phone such as a smart phone, a personal digital assistant (PDA), a portable media player, a netbook, smart watch or the like.

Figure 1B:
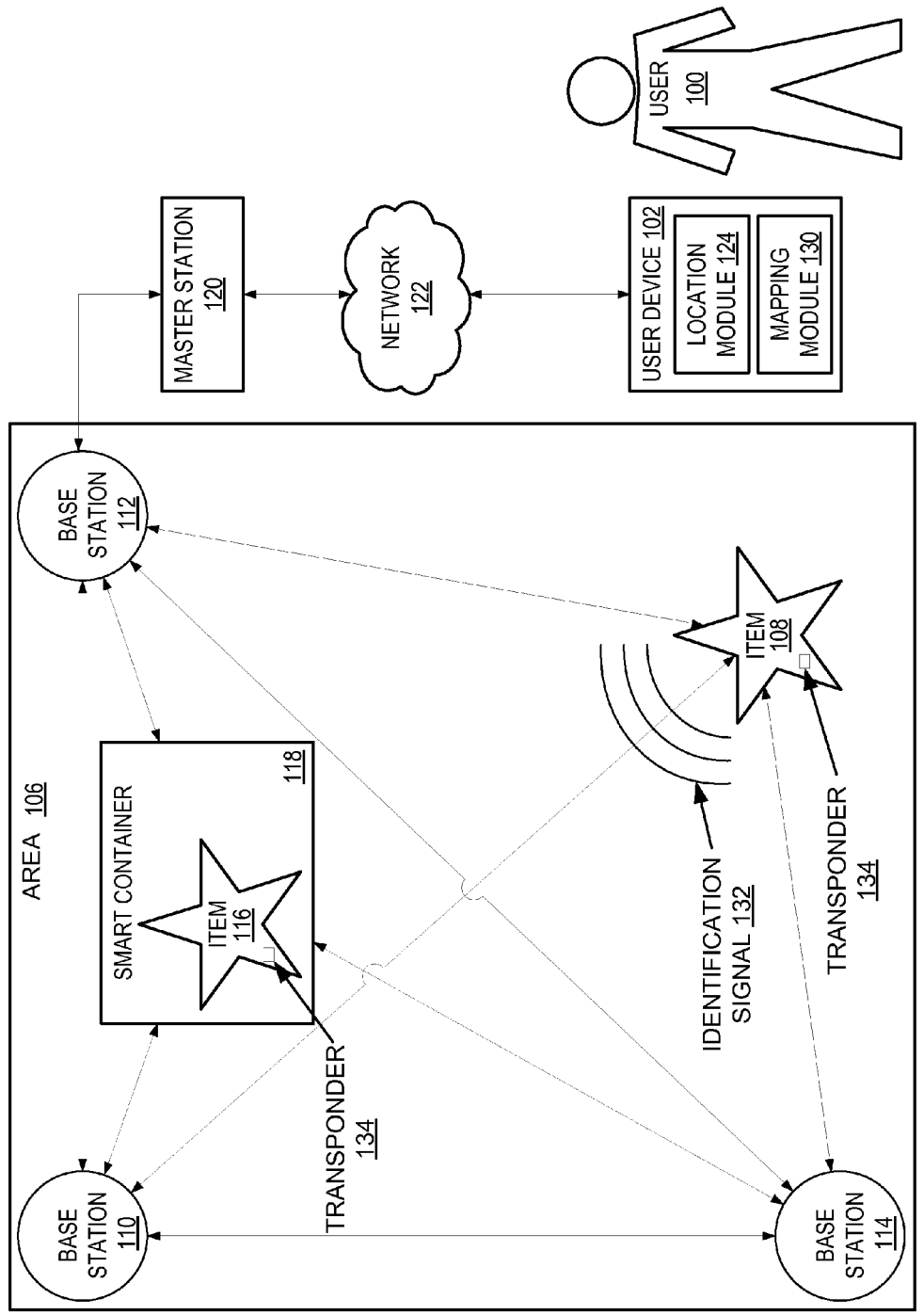
FIG. 1B illustrates a second example inventory tracking and management system in accordance with various implementations.

The location module 124 may comprise a database of items along with properties associated with the items (i.e., designated location, what the item is, what the item is used for, etc.) Computing systems described herein (e.g. 128) are each capable of communicating with one another via network 122. In another embodiment, user device 102 may communicate directly with base stations 110, 112, 114 via network 122 and the base station 120 (e.g. FIG. 1B). In this embodiment, location module 124 may reside on user device 102. Network 122 may include, for example, private network such as a local area network (LAN), a wide area network (WAN), a global area network (GAN) such as the Internet, or a combination of such networks, and may include a wired or wireless network. Various networks described herein may be the same network or different networks altogether.

In one embodiment, once the location request has been received, location module 124 determines where an item is located in area 106 by sending a location request via network 122 to the master station 120. The master station may then relay the location request to base station 112. Base station 112 may then relay the location request to base stations 110, 114. The base stations 110, 112, 114 may locate item 108 by sending location request to item 108, receive response signals, and triangulate the item 108 based on the response signals. In some embodiments, the user 100 may want to locate item 116 inside of smart container 118. Upon receiving location request from base stations 110, 112, 114, smart container 118 may query all contained smart labels looking for item 116. When item 116 has been found, smart container 118 may relay location information back to base stations, 110, 112, 114. Smart containers 118 may also retain an inventory of items located within the container limiting the need to communicate directly with the item and hence extending battery life of the item. In one embodiment, base stations 110, 112, 114 send location and other information to the master station 120. The master station 120 sends location and other information to the location module 124 through network 122. The location module 124 may process the information and send the information to user device 102.

In another embodiment, the user 100 sends a mapping request to mapping module 130 on server 126 of server computing system 128 via user device 102. Base stations 110, 112, 114, may be devices capable of mapping area 106. For example, base stations 110, 112, 114 may be placed in one room of a house, or commercial or industrial building, where they are directed to map the room or surrounding area. Mapping-enabled base stations 110, 112, 114, may employ sound systems (e.g. sonar, radar), optical systems (e.g. lasers, cameras), and the like to measure a portion of an area. The mapping module 130 receives measurement data from mapping-enabled base stations 110, 112, 114 via the master station 120. Using the measurement data, the mapping module 130 generates a multi-dimensional map of the room and floor plan. In some embodiments, an aerial or ground-moving drone may be used to create multi-dimensional maps and floor plans of areas. In other embodiments, multi-dimensional maps and floor plans created independently may be uploaded to and utilized by the mapping module 130.

In one embodiment, the multi-dimensional map may be used to accurately describe the location of items. For example, upon receiving location information for item 108 from base stations 110, 112, 114, the location module 124 may determine, based on the triangulated location and a multi-dimensional map of the area, that item 108 is on the bookshelf in the south-east corner of area 106. In other embodiments, mapping-enabled base stations 110, 112, 114 are capable of tracking an item's location when moved around the room and notifying user 100 of movement. The base stations 110, 112, 114 may periodically inventory all items (e.g. 116, 108) in area 106. For example, base stations 110, 112, 114 located inside a refrigerator may periodically inventory refrigerated items and notify user 100 when an item needs to be restocked or replaced. In another embodiment, the user 100 may authorize the location module 124 to place an order for an item in response to the item needing to be restocked or replaced. The location module 124 may generate shopping lists based on inventories and user-configurable quantity thresholds. The location module 124 may generate a list of items associated with a task the user 100 is about to perform or an activity the user is about to engage in such as camping, boating, vacation, going to school, going to work and the like. The location module 124 may also track normal usage patterns of item 108 and notify user 100 when abnormal patterns occur. In another embodiment, a user 100 may determine allowable boundaries for an item 108. When item 108 is taken outside of its allowable boundary, user 100 may be notified. In another embodiment, location module 124 may monitor use patterns for item 108 and provide recommendations based on the use patterns. For example, location module 124 may suggest a particular order, based on past usage, in which to pack a smart container 118 or to use various items to maximize efficiency. As another example, inventory tracking and management system, may be used to locate and organize products and their corresponding battery charger and/or power supply.

In other embodiments, the location module 124 may assist in simple organizing and sorting tasks. For instance, a user 100 may wish to sort his or her tools such as socket sets, drill bits and the like in a particular order. The location module 124 may cause LED lights to flash in sequential order on the sockets, indicating to the user 100 the particular order in which they should be sorted. The location module 124 may identify any missing sockets and notify the user 100 of the missing sockets' location. In another embodiment, the location module 124 may cause sock pairs may to flash at the same time, thus facilitating the identification of matching pairs. In one embodiment, the smart labels on the sock pairs include electromagnets, thereby enabling the location module 124 to activate the corresponding electromagnets in a pair of socks, causing them to automatically sort themselves. In another embodiment, a conveyor belt for a clothes dryer may read smart labels on clothing and sort the clothing accordingly.

In one embodiment, user 100 may configure the location module 124 to group items into useful categories. For instance, a user 100 might configure the location module 124 to pair a phone with a particular phone charger. In one embodiment, if the user's 100 phone is packed before a trip and the corresponding charger remains next to the desk, the user 100 may receive a notification reminding user 100 to pack the charger and notifying user 100 of the charger's location. In another embodiment, the location module 124 may be configured to notify user 100 if a particular item is ever in a particular place. For example, a user 100 may wish to be notified if his or her car keys are ever accidentally thrown away. The location module 124 may periodically query the keys (with smart label) to be sure they aren't in the trash (smart container 118).

In other embodiments, item 108 is assigned a designated location where the item should reside. The location module 124 may notify user 100 if an item is not at its designated location, and inform the user 100 of the item's current location. In one embodiment, a base station 110 may be used to determine information about an item 108. For example, item 108 may be held next to base station 110, causing location module to provide the user 100 with information about the item such as the item's home base, usage details, and sorting details (e.g. location of the item's pair, the category to which the item belongs).

In other embodiments, the system will have the ability for users to customize system operation through software programming, macro languages, graphical user interfaces and the like to extend and customize system functionality to support new emerging applications and use cases for the system.

In other embodiments, base stations 110, 112, 114 need not be used to locate an item 108. Instead, the location module 124 may rely on locating technologies such as GPS and GSM to locate item 108. In some embodiments, user device 102 may serve as an additional base station or may directly locate item 108 by utilizing locating technologies like RFID.

Figure 2:
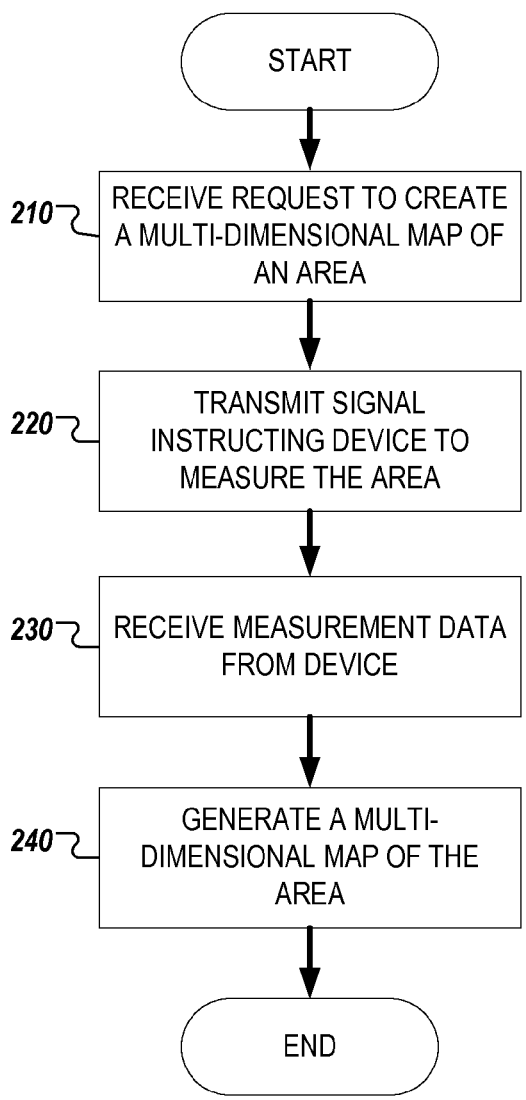
FIG. 2 is a flow chart of method of generating a multi-dimensional map of an area.

FIG. 2 is a flow chart of method 200 of generating a multi-dimensional map of an area. For the sake of clarity, the following method of generating a multi-dimensional map of an area will be described using base stations 110, 112, 114 to acquire measurement data of an area (e.g., 106). However, in some embodiments other devices, such as aerial or ground-moving drones, may be used to acquire the measurement data of the area 106.

At phase 210, the mapping module 130 receives a request to create a multi-dimensional map of the area 106 from the user 100. In one embodiment, the multi-dimensional map of the area 106 may be a two-dimensional view of area 106, where the two-dimensional view is comprised of two spatial dimensions. In other embodiments, the multi-dimensional map of the area 106 may be a three-dimensional view of area 106, where the three-dimensional view is comprised of three spatial dimensions. In some embodiments, the multi-dimensional map of the area 106 may be a four-dimensional view of area 106, where the four-dimensional view is comprised of three spatial dimensions plus one time dimension to illustrate a spatio-temporal environment. At phase 220, the mapping module 130 transmits a signal via the master station 120 to base stations 110, 112, 114, instructing the base stations 110, 112, 114 to measure portions of area 106, where the measured portions of area 106 may be combined into a complete multi-dimensional representation of area 106. At phase 230, the mapping module 130 receives measurement data transmitted from base stations 110, 112, 114 via the master station 120. At phase 240, the mapping module 130 generates a multi-dimensional map of area 106 based on the received measurement data transmitted from base stations 110, 112, 114.

Figure 3:
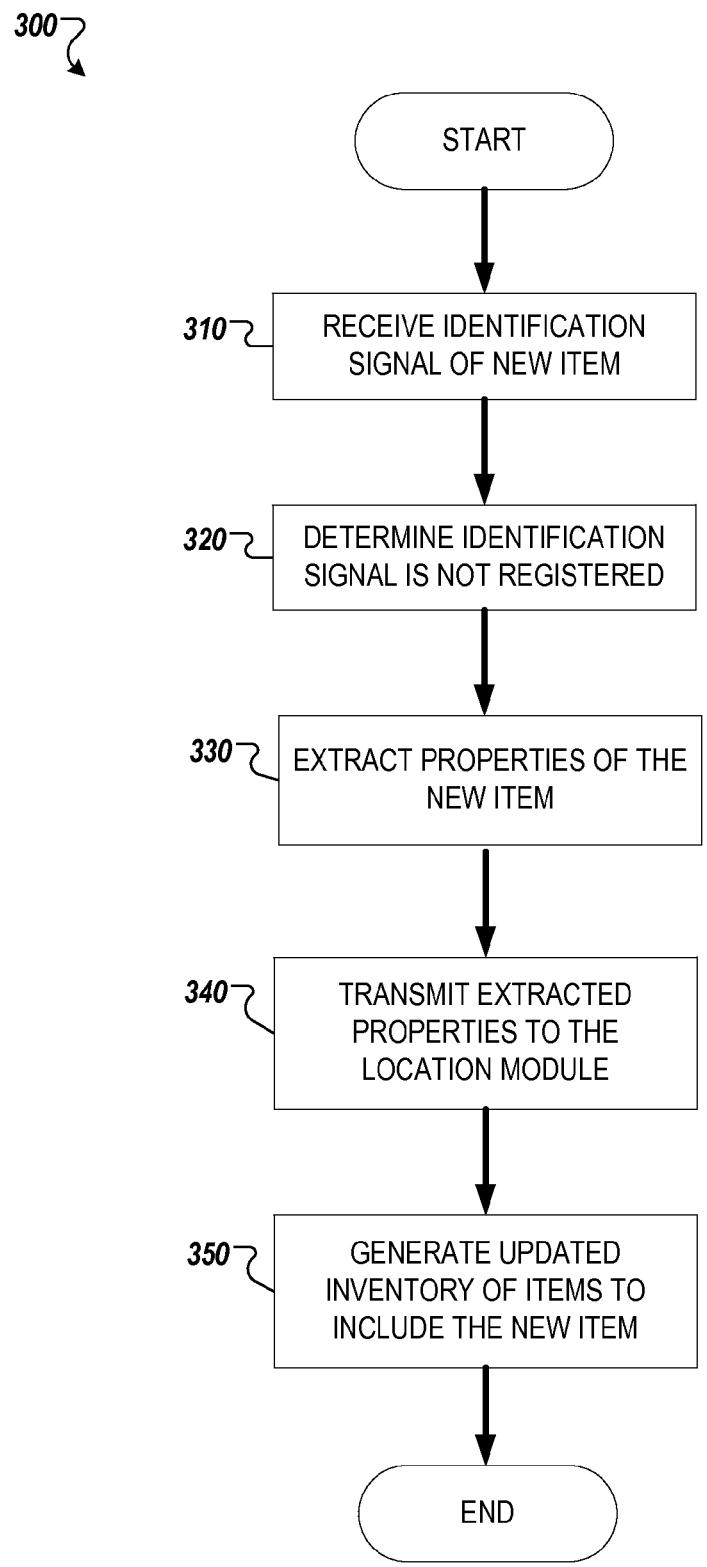
FIG. 3 is a flow diagram of a method of adding a new item to the database.

FIG. 3 is a flow diagram of a method 300 of adding a new item to the database of the location module 124. At phase 310, base stations 110, 112, 114 receive an identification signal 132 transmitted by a smart label affixed to the new item. The identification signal 132 transmitted by the smart label is relayed to the master station 120. In one embodiment, the new item may be purchased with a smart label affixed to the new item. In another embodiment, the smart label may be affixed to the new item by the user 100 after purchase. At phase 320, the master station 120 determines that the identification signal 132 transmitted by the smart label is not registered in the database of location module 124. At phase 330, the master station 120 via base stations 110, 112, 114 extracts the properties of the new item using the identification signal 132 transmitted by the smart label. In one embodiment, the smart label affixed to the new item may be previously programmed with properties associated with the new item. Alternatively, the smart label affixed to the new item may be programmed by the user 100 with properties associated with the new item. At phase 340, the master station 120 transmits the extracted properties associated with the new item to the location module 124. At phase 350, the location module 124 generates an updated inventory of items in the database to include the new item.

Figure 4:
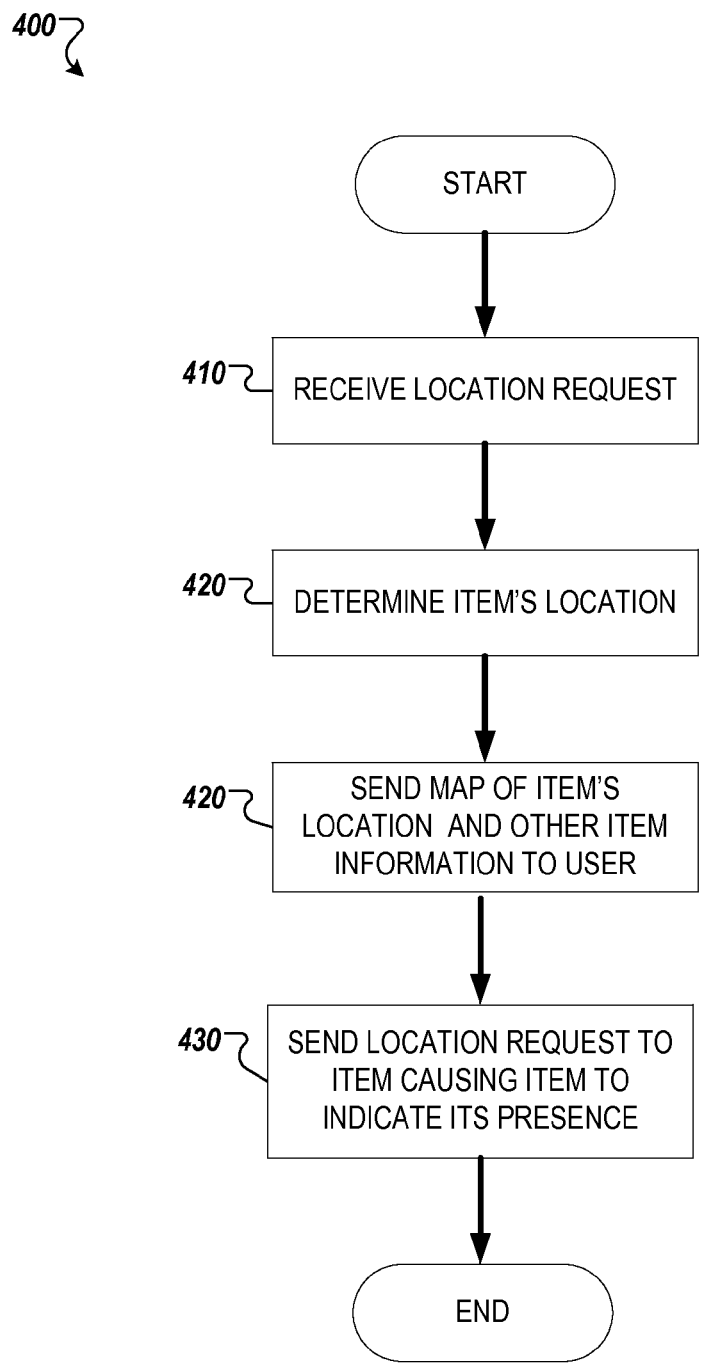
FIG. 4 is a flow diagram of a method of locating an item in accordance with some embodiments.

FIG. 4 is a flow diagram of a method for locating an item in accordance with some embodiments. The method 400 is performed by processing logic that comprises hardware (e.g., circuitry, dedicated logic, programmable logic, microcode, etc.), software (e.g., instructions run on a processing device to perform hardware simulation), or a combination thereof. In one embodiment, locating module 124 may perform method 400. In another embodiment, other components of the devices illustrated in FIG. 1 perform some or all of the operations. Method 400 may be performed in any order so as to fit the needs of the specific location to be accomplished.

At phase 410, location module 124 receives a location request from a user 100. In one embodiment, processing logic then determines the location (phase 420) of the requested item 108 using locating technologies described above. In one embodiment, base stations 110, 112, 114 triangulate the item's smart label. It should be noted that triangulation for location finding be performed using multiple base stations to determine location in multiple dimensions. In some embodiments, the user 100 is not located within range of base stations 110, 112, 114. For example, a user 100 may be at work and realize that he or she does not have his or her wallet. Processing logic may determine the location of the wallet at home, using base stations 110, 112, 114 to triangulate the wallet's signal, while the user 100 remains at work. At phase 430, processing logic sends a map of the item's surrounding location and additional item information (e.g. pattern data, location of matching pairs, category data) to the user 100. In one embodiment, the location module may also send other information pertaining to the location of the requested item 108. Such information may include a container in which the requested item 108 currently resides, a room in which the requested item 108 currently resides, a list of other items also residing in the container and/or room in which the requested item 108 resides, a category in which the item 108 belongs, and a list of other items in the same or similar categories and their locations. At phase 440, processing logic may send the location request to the item 108 causing the item to indicate itself via its smart label systems.

In one embodiment, images such as photographs may be used to augment the locating of items. For example, during a system installation, pictures can be taken of a room or areas of a building in which items may be located (e.g., 106) and then the location of the various items whose image is acquired can be plotted. Alternatively, one or more of base stations 110, 112, 114 may include cameras (e.g., visible, infrared, etc.) that can take still images or video images of area 106 and transmit the images to server 126 to indicate the location of the items to be found.

Figure 5:
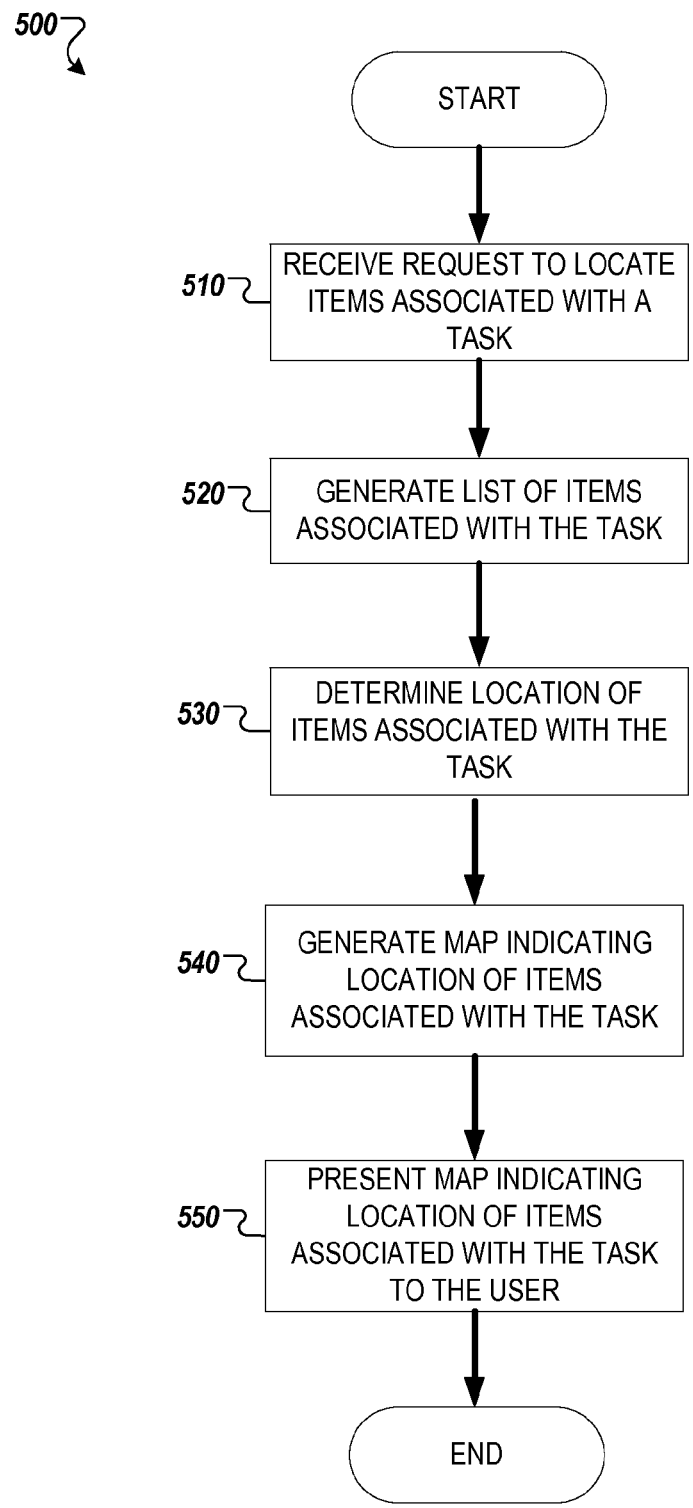
FIG. 5 is a flow diagram of a method of generating a map indicating the location of items associated with a task.

FIG. 5 is a flow diagram of a method 500 of generating a map indicating the location of items associated with a task. At phase 510, the location module 124 receives a request from user 100 to locate all items associated with a task. In one embodiment, the request from the user 100 may be the user 100 manually selecting the task being performed from a user interface. In another embodiment, the location module 124 may determine the task being performed in response to the user's 100 recent internet searches, booking of hotels, booking of flights or the like. At phase 520, the location module 124 generates a list of items associated with the task based on the properties of the items. At phase 530, the location module 124 determines the location of the items from the list of items associated with the task. The location module 124 determines the location of the items using the method described above in FIG. 4. At phase 540, the location module 124 generates a map indicating the location of the items associated with the task. In one embodiment, the map may be a multi-dimensional representation of area 106. At phase 550, the location module 124 presents to the user 100 on the user device 102 the generated map indicating the location of the items associated with the task.

Figure 6:
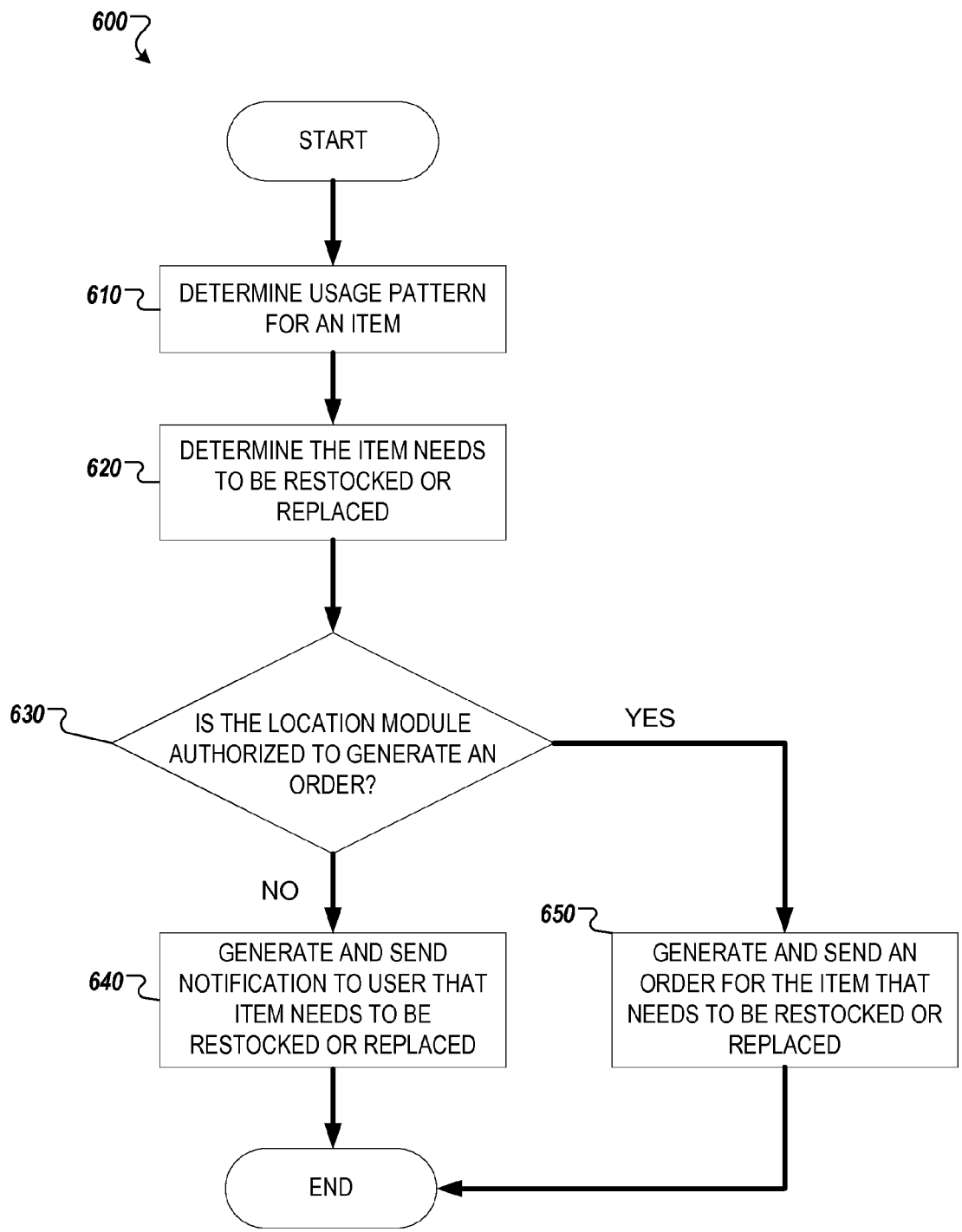
FIG. 6 is a flow diagram of a method of determining usage patterns of items.

FIG. 6 is a flow diagram of a method 600 of determining usage patterns of items. At phase 610, the location module 124 determines the usage patterns of items by tracking the smart labels affixed to the items and performing a periodical inventory of the items. Items are tracked using the method described above in FIG. 4. At phase 620, the location module 124 determines that an item needs to be restocked or replaced based on information transmitted by the smart label associated with the item. In one embodiment, the smart label may have an integrated sensor capable of detecting the contents of the item. For example, a carton of milk may be equipped with a smart label having a capacitive sensor that detects the amount of milk remaining in the carton. In some embodiments, the location module 124 detects that an item has been thrown away in a trash can and in response determine that the item needs to be restocked or replaced. At phase 630, the location module 124 queries the database to determine if the user 100 has authorized the location module 124 to purchase a replacement for the item. At phase 640, if the user 100 has not authorized the location module 124 to purchase a replacement for the item, the location module 124 generates and sends a notification to the user device 102 alerting the user 100 that the item needs to be restocked or replaced. At phase 650, if the user 100 has authorized the location module 124 to purchase a replacement for the item, the location module 124 generates an order for the item that needs to be restocked or replaced. In one embodiment, the location module 124 may order the item that needs to be restocked or replaced from a preferred retailer that is specified by the user 100. In another embodiment, the location module 124 may query multiple retailers and order the item from a retailer in response to criteria (e.g., price, delivery date, etc.) specified by the user 100.

Figure 7:
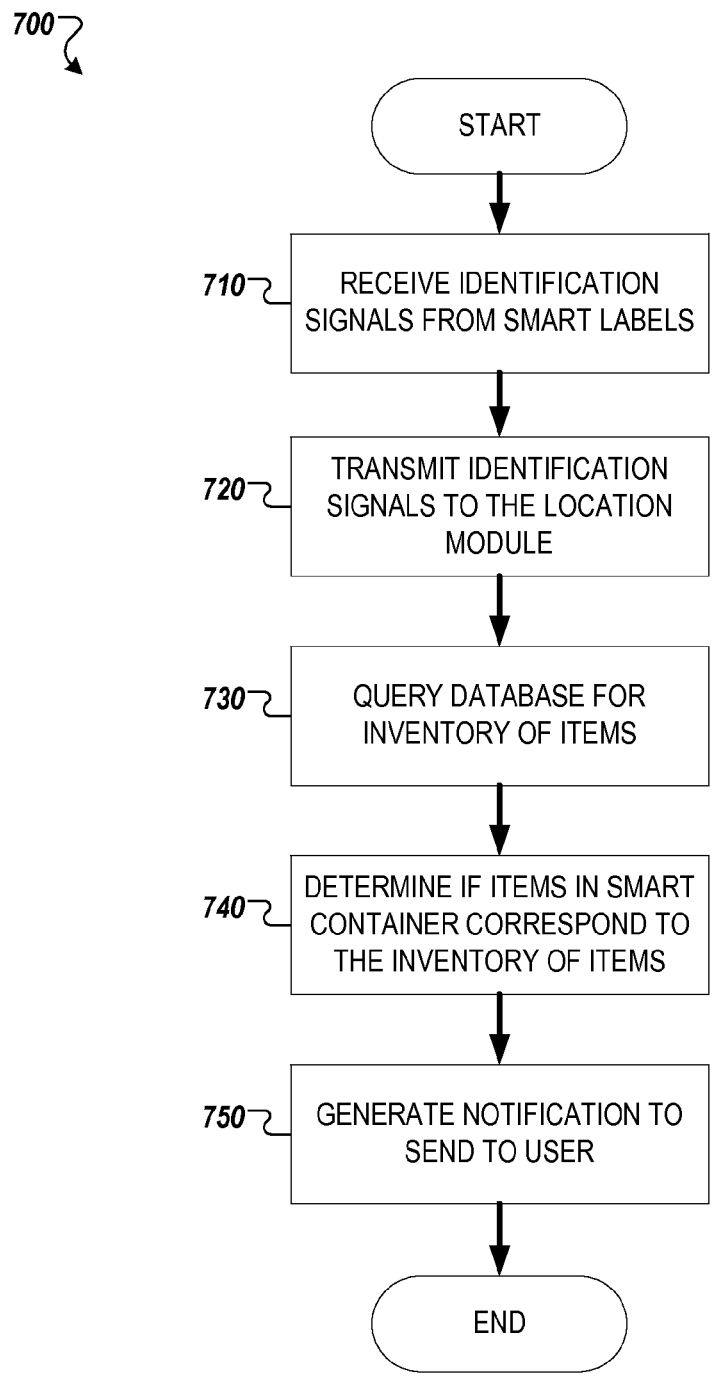
FIG. 7 is a flow diagram of a method of a smart container determining its contents.

FIG. 7 is a flow diagram of a method 700 of a smart container 118 determining its contents. A smart container 118 may be affixed with three or more sensors similar to base stations 110, 112, 114 and identifies items inside the container using the method described above in FIG. 4. At phase 710, the sensors affixed to the smart container 118 receive the identification signals 132 of smart labels affixed to the items contained in the smart container 118. At phase 720, the sensors transmit the identification signals 132 to the location module 124 via the master station 120. At phase 730, the location module 124 queries the database for an inventory of items that are to be located in smart container 118. In one embodiment, the inventory of items that are to be located in the smart container 118 can be determined by the user 100. In another embodiment, the location module 124 can determine the inventory of items that are to be located in the smart container 118 by pairing items associated with the same categories in the same smart container 118 (e.g., camping items, school supplies, etc.) At phase 740, the location module 124 determines if the items located in the smart container 118 corresponds to the inventory of items that are to be located in the smart container 118. At phase 750, if the location module 124 determines the items located in the smart container 118 do not correspond to the inventory of items that are to be located in the smart container 118, the location module 124 generates a notification to send to the user 100. In one embodiment, the location module 124 generates and provides a map as a notification to the user 100 indicating the locations of items from the inventory of items that are missing from the smart container 118. In another embodiment, the location module generates and provides a notification to the user 100 indicating that an item located in smart container 118 is not in the inventory of items to be contained in the smart container 118.

Smart containers 118 may be any container, surface or space capable of containing an item. Smart containers 118 may be items such as washing machines, dishwashing machines, refrigerators, cabinets, closets, shelves, shelving paper, drawers, desks, tables, furniture, articles of clothing and automobiles. Smart containers 118 may be in public areas such as benches, parking spots, and hotel rooms. Smart containers 118 may be any size and may include perimeter barriers, such as city boundary lines. A smart container 118 can also be defined as the inside of an area such as a structure (e.g., a home, factory or commercial building), outside of a structure, or within portions of a structure (e.g., specific rooms in a home). In some embodiments, smart containers 118 include a smart label like those described above.

In one embodiment, the smart label may have an activation device (e.g., a switch) with a transmitter to send a signal to other nearby smart labels or containers requesting that they announce their location. The announcement may take over or more of various forms such as a flashing light using an LED or sound (e.g., buzz) using an audio device. The activation may also put the inventory tracking and management system into a mode that uses other nearby smart labels to triangulate the location of some or all nearby items. For example, a smart label with a key fob may send a signal to a lost smart phone.

In various embodiments, smart containers 118 are capable of being located and announcing their location. In other embodiments, a smart container 118 can determine its contents, and locate a particular item contained. A smart container 118 may also cause the particular item to announce its location, by activating the lighting system, vibration system, sound system, and/or graphics display system on the item's smart label. The smart container 118 can display or announce (via the graphics display system or sound system) the type of contents (e.g. the categories of items) contained. The smart container 118 identifies items contained by querying the items' smart labels. For example, a user 100 may push a button on the smart container 118 and the container may show "camping gear" on its video display. The smart container 118 may then list the camping items contained. In another embodiment, the smart container 118 displays or announces items contained when the user 100 is within a specified proximity of the smart container 118.

In another embodiment, the smart container 118 knows what items (e.g. according to the items' categories) it is supposed to contain and can identify missing items. For example, if a user's 100 car is set up as a smart container 118 and the user 100 loads up camping gear for a trip, the user 100 may push a button after loading up the camping gear and the car can scan smart labels of camping gear contained, identify missing items, and notify the user 100. The location module 124 may also identify missing items or suggest locating or purchasing additional items in response to camping gear being placed within the car. Alternatively, the user 100 can send a request to locate all camping gear to a server 126. The server 126 may then locate the camping gear and provide the user 100 with a map of their home, including where the camping gear is located. In some embodiments, the user 100 is provided with a list of camping gear and the items' location in the house and location within smart containers 118. The user 100 may then choose to have camping gear items announce themselves via their smart label systems.

Figure 8:
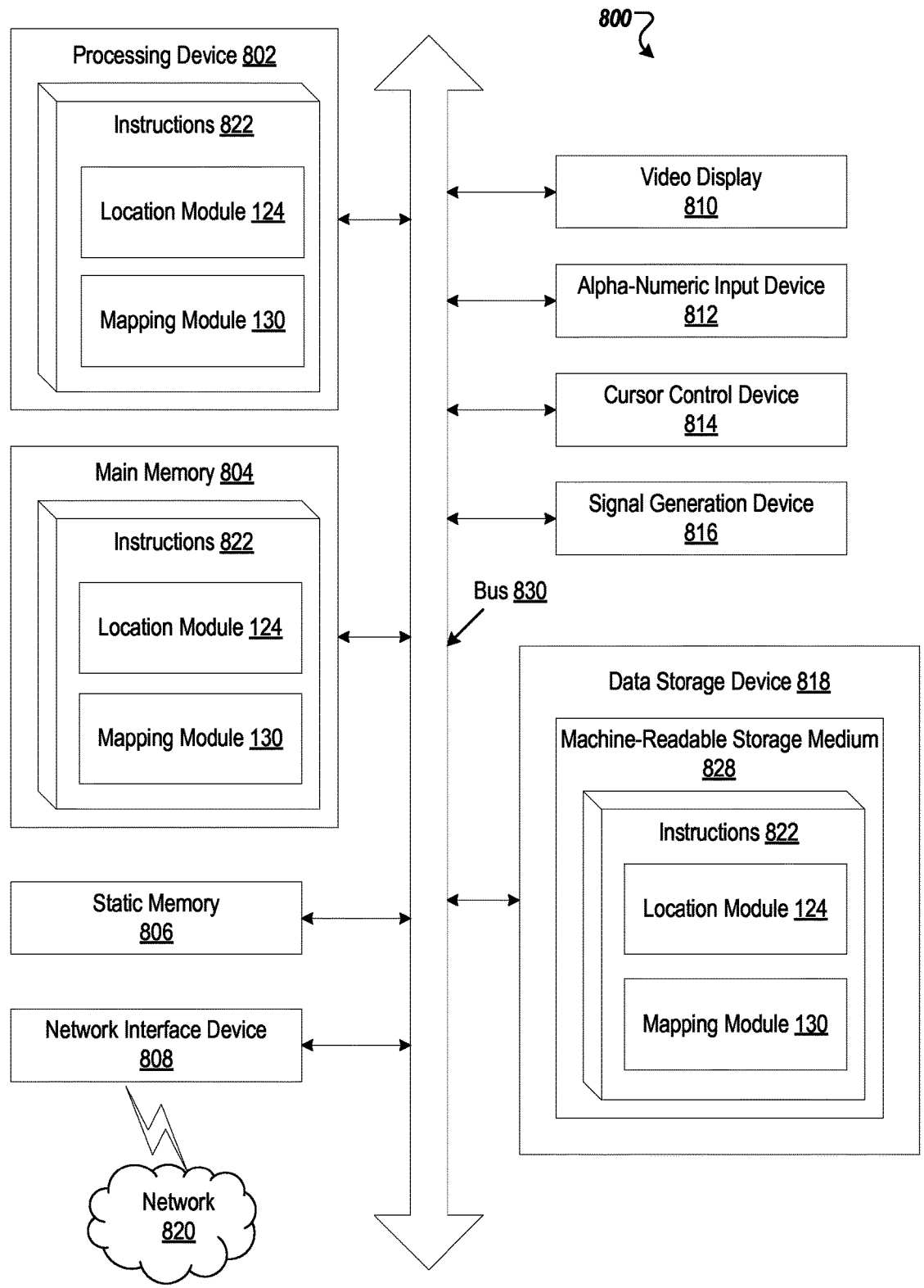
FIG. 8 is a block diagram of an example computer system that may perform one or more of the operations described herein.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, smart watch, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a data storage device 818, which communicate with each other via a bus 830.

Processing device 802 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processors such as an application specific integrated circuit (ASIC), a field programmable gate array (FPGA), a digital signal processor (DSP), network processor, or the like. The processing device 802 is configured to execute instructions 822 for performing the operations and steps discussed herein.

The computer system 800 may further include a network interface device 808. The computer system 800 also may include a video display unit 810 (e.g., a LED array, a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions or software 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting machine-readable storage media.

In one implementation, the instructions 822 include instructions for a location module and a mapping module (e.g., location module 124 and mapping module 130 of FIG. 1) and/or a software library containing methods that call modules or sub-modules in a location module. While the machine-readable storage medium 828 is shown in an example implementation to be a single medium, the term "non-transitory computer-readable storage medium" or "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "sorting" or "performing" or "locating" or "receiving" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method of enabling the location and tracking of items comprising:
   receiving an identification signal transmitted by a transponder, wherein the identification signal is associated with an item;
   determining the identification signal transmitted by the transponder is unregistered;
   extracting, by a processing device, properties of the item associated with the unregistered identification signal transmitted by the transponder, wherein the transponder is previously programmed with the properties of the item; and
   transmitting, to a database, the extracted properties of the item associated with the unregistered identification signal transmitted by the transponder.

2. The method of claim 1, further comprising:
   identifying one or more items in the database associated with a task; and
   generating a view listing locations of the one or more items associated with the task.

3. The method of claim 2, further comprising:
   generating a notification if a user exceeds a proximity threshold from the one or more items associated with the task.

4. The method of claim 1, further comprising:
receiving a request to locate the item;
determining the location of the identification signal transmitted by the transponder associated with the item; and
generating a view listing the location of the identification signal transmitted by the transponder associated with the item.

5. The method of claim 1, wherein the transponder comprises a smart label.

6. The method of claim 1, wherein the associated list of properties is updated in response to a user input.

7. The method of claim 1, further comprising:
determining a usage pattern for the item in view of the tracking of the identification signal transmitted by the transponder and
generating, by the processing device, a notification that a replacement for the item is required in response to the usage pattern of the item.

8. The method of claim 7, further comprising:
generating, by the processing device, an online order for a replacement of the item in response to the usage pattern of the item.

9. The method of claim 7, further comprising:
presenting, by the processing device, recommendations and advertisements in view of the usage pattern for the item.

10. A method of enabling the location and tracking of items comprising:
performing a query of items contained in a container;
receiving identification signals transmitted by transponders, wherein the identification signals are associated with the items;
determining the items contained in the container; and
generating, by a processing device, an inventory of items contained in the container.

11. The method of claim 10, further comprising:
receiving the inventory of items contained in the container;
determining a category of the inventory of items contained in the container in view of properties of the inventory of items; and
presenting the category of the inventory of items contained in the container.

12. The method of claim 10, further comprising:
generating a notification if an item not in the inventory of items is placed in the container.

13. The method of claim 10, further comprising:
presenting recommended items to be contained in the container in view of the category of the inventory of items contained in the container or an activity associated with the inventory of items.

14. The method of claim 10, further comprising:
generating a notification if an item in the inventory of items is removed from the container.

15. The method of claim 10, wherein the category of the inventory of items contained in a container is determined in response to a user input.

16. A method comprising:
receiving a request to create a multi-dimensional map of an area;
sending a command to a device to determine the dimensions of the area;
receiving transmitted dimensions of the area from the device; and
generating, by a processing device, the multi-dimensional map of the area based on the transmitted dimensions of the area.

17. The method of claim 16, wherein the device transmits a portion of the multi-dimensional map of the area.

18. The method of claim 16, wherein the multi-dimensional map of the area is comprised of two dimensions.

19. The method of claim 16, wherein the multi-dimensional map of the area is comprised of three dimensions.

20. The method of claim 16, wherein the multi-dimensional map of the area is comprised of four dimensions.

* * * * *